(12) United States Patent
Hively et al.

(10) Patent No.: US 10,346,890 B2
(45) Date of Patent: Jul. 9, 2019

(54) SYSTEMS AND METHODS FOR CONSOLIDATING AND STANDARDIZING BILLING EVENT DATA

(71) Applicant: MasterCard International Incorporated, New York, NY (US)

(72) Inventors: Corey M. Hively, O'Fallon, MO (US); Mary Marsh, Ballwin, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 13/907,266

(22) Filed: May 31, 2013

(65) Prior Publication Data

US 2014/0358750 A1    Dec. 4, 2014

(51) Int. Cl.
*G06Q 20/10* (2012.01)
*G06Q 30/04* (2012.01)
*G06Q 40/02* (2012.01)
*G06Q 40/00* (2012.01)

(52) U.S. Cl.
CPC .......... *G06Q 30/04* (2013.01); *G06Q 20/102* (2013.01); *G06Q 40/00* (2013.01); *G06Q 40/02* (2013.01); *G06Q 40/10* (2013.01)

(58) Field of Classification Search
USPC ......................................................... 705/34
See application file for complete search history.

(56) References Cited

U.S. PATENT DOCUMENTS

| | | | |
|---|---|---|---|
| 4,989,141 A | 1/1991 | Lyons et al. | |
| 5,189,608 A | 2/1993 | Lyons et al. | |
| 5,852,812 A * | 12/1998 | Reeder | 705/39 |
| 6,002,754 A * | 12/1999 | Jaiswal et al. | 379/114.28 |
| 6,058,380 A | 5/2000 | Anderson et al. | |
| 6,493,685 B1 | 12/2002 | Ensel et al. | |
| 6,965,668 B2 | 11/2005 | Clark et al. | |
| 7,154,998 B2 | 12/2006 | Clark et al. | |
| 7,653,187 B2 | 1/2010 | Clark et al. | |
| 7,761,377 B2 | 7/2010 | Meier et al. | |
| 8,108,432 B2 * | 1/2012 | Westin | G06F 17/3028 707/792 |
| 8,175,969 B2 | 5/2012 | Yang et al. | |
| 2002/0120473 A1 * | 8/2002 | Wiggins | G06Q 10/087 705/4 |
| 2002/0143674 A1 | 10/2002 | Beckman | |
| 2004/0062370 A1 * | 4/2004 | O'Neal et al. | 379/112.01 |
| 2005/0010523 A1 | 1/2005 | Myklebust et al. | |
| 2005/0131780 A1 | 6/2005 | Princen | |
| 2006/0173778 A1 * | 8/2006 | Lipsky et al. | 705/40 |
| 2007/0244852 A1 * | 10/2007 | Giulio | G06F 17/30979 |
| 2008/0010204 A1 * | 1/2008 | Rackley, III et al. | 705/45 |

(Continued)

*Primary Examiner* — Luna Champagne
(74) *Attorney, Agent, or Firm* — Armstrong Teasdale LLP

(57) ABSTRACT

A computer-implemented method for consolidating and standardizing billing event data is implemented by a computing device coupled to a memory device. The method includes polling a plurality of billing event tables for a pending billing event, extracting billing event data associated with the pending billing event from at least one of the billing event tables, generating a billing output file based upon at least a portion of the billing event data, selecting a billing system from the plurality of billing systems based upon the billing event data, and routing the billing output file to the selected billing system.

17 Claims, 6 Drawing Sheets

(56) References Cited

U.S. PATENT DOCUMENTS

| | | | |
|---|---|---|---|
| 2008/0250101 A1* | 10/2008 | Tanaka | G11B 27/005 709/203 |
| 2009/0100203 A1* | 4/2009 | Wei | G06F 11/2289 710/46 |
| 2009/0129572 A1* | 5/2009 | Bingaman et al. | 379/114.05 |
| 2010/0086114 A1 | 4/2010 | Clark et al. | |
| 2011/0119362 A1* | 5/2011 | Kodama | H04L 67/24 709/223 |
| 2013/0100490 A1* | 4/2013 | Imoto | G06F 3/1207 358/1.15 |
| 2013/0144782 A1* | 6/2013 | Eberle et al. | 705/40 |
| 2014/0019620 A1* | 1/2014 | Kono | H04L 47/70 709/226 |

\* cited by examiner

SYSTEMS AND METHODS FOR CONSOLIDATING AND STANDARDIZING BILLING EVENT DATA

BACKGROUND OF THE DISCLOSURE

The field of the disclosure relates generally to billing methods, and more particularly, to systems and methods for consolidating and standardizing billing event data.

At least some known billing centers use a plurality of billing systems for processing billing requests. Each of the different billing systems may require different data and data structure for their respective billing requests. Additionally, coordinating billing requests to the appropriate receiving billing systems in the appropriate billing request format may be resource intensive. Some billing requests include information which may be used to self-identify the billing requests as associated with a particular billing system.

BRIEF DESCRIPTION OF THE DISCLOSURE

In one aspect, a computer-implemented method for consolidating and standardizing billing event data is provided. The method is implemented by a computing device coupled to a memory device. The method includes polling a plurality of billing event tables for a pending billing event, extracting billing event data associated with the pending billing event from at least one of the billing event tables, generating a billing output file based upon at least a portion of the billing event data, selecting a billing system from the plurality of billing systems based upon the billing event data, and routing the billing output file to the selected billing system.

In another aspect, a computer system for consolidating and standardizing billing event data is provided. The computer system includes a processor and a memory device in communication with the processor. The computer system is configured to poll a plurality of billing event tables for a pending billing event, extract billing event data associated with the pending billing event from at least one of the billing event tables, generate a billing output file based upon at least a portion of the billing event data, select a billing system from the plurality of billing systems based upon the billing event data, and route the billing output file to the selected billing system.

In a further aspect, computer-readable storage media for consolidating and standardizing billing event data is provided. The computer-readable storage media has computer-executable instructions embodied thereon. When executed by at least one processor, the computer-executable instructions cause the processor to poll a plurality of billing event tables for a pending billing event, extract billing event data associated with the pending billing event from at least one of the billing event tables, generate a billing output file based upon at least a portion of the billing event data, select a billing system from the plurality of billing systems based upon the billing event data, and route the billing output file to the selected billing system.

BRIEF DESCRIPTION OF THE DRAWINGS

The Figures listed below show example embodiments of the methods and systems described herein.

Figure 1:
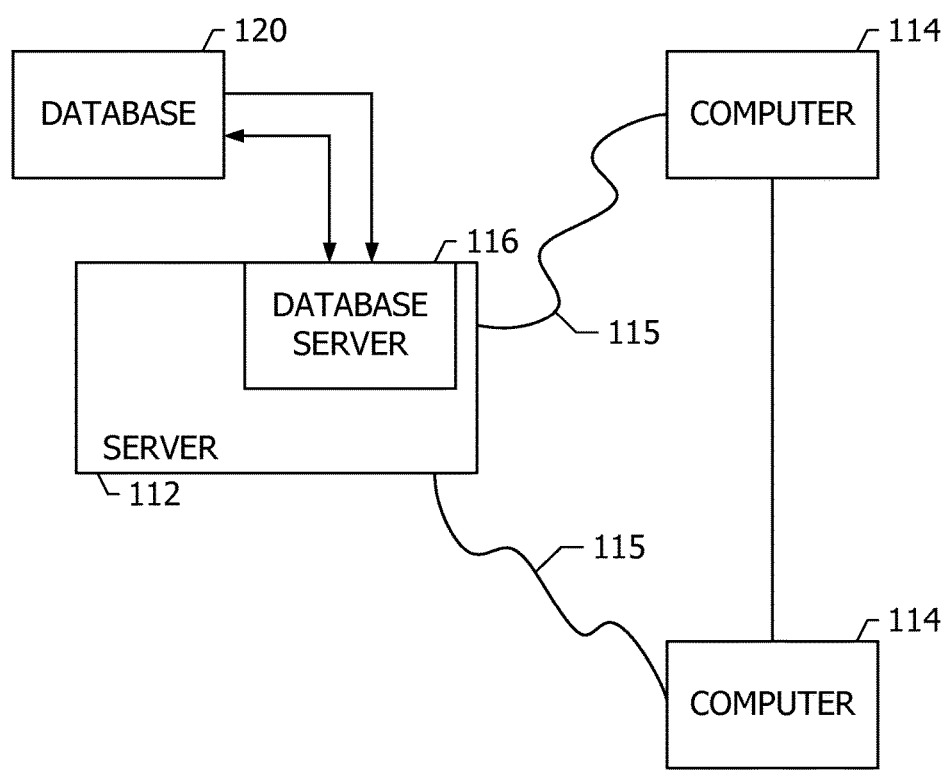
FIG. 1 is a simplified block diagram of an example embodiment of a system for consolidating and standardizing billing event data in accordance with one embodiment of the present disclosure.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

This subject matter described herein relates generally to consolidating and standardizing billing event data for routing to an appropriate billing system which may be subsequently used to generate a bill for a customer or customers. The billing event data is extracted from a plurality of billing event tables stored in a billing event database. The methods and systems described herein provide the capability for polling of a plurality of billing event tables, the extraction of billing event data from the billing event tables, and the generating and routing of a billing output file based upon the billing event data.

In many billing centers, billing event data may be generated by a variety of sources corresponding to distinct applications and services. For example, in the context of financial transactions, one or more elements of billing event data may be generated separately by a case management system that provides case management services to a merchant bank, by an IT provisional system which provides IT services to issuer banks, and to an investigation services system which provides investigation services to a merchant bank. Each of these systems may provide different services and record different types of data. However, in order to use a common billing infrastructure, the data must be standardized such that all billing data can be converted to an appropriate billing request. Accordingly, each system creates billing event data that is written to a plurality of billing event tables. The billing event tables may be sub-divided. For example, the billing event tables may include a generic billing event table that includes high-level billing event data and metadata such as a file name, file path, unique identifier, timestamp, record length, and references to related records. The billing event tables may also include detailed billing event tables that include the core billing event data such as billing codes, total charges to bill, customer identifiers, vendor identifiers, quantities of products or services, and costs of products or services. The detailed billing event tables may also include status flags that indicate whether billing event data is pending. The status flags provide an indication whether the billing event data has been previously extracted. In other words, the status flags allow the system to determine whether billing event data should be extracted to generate a new billing output file. The billing event tables may further include process control tables that indicate how the billing event tables should be utilized. For example, process control tables may contain data including one or more of how frequently to monitor billing event tables, schematic data explaining the layout of billing event tables, and preferences related to the polling and extraction of billing event tables, and serves as an audit trail for billing processes.

In the systems and methods described herein, a computing device polls (i.e., queries) the plurality of billing event tables for a pending billing event. The computing device may be physically distinct, integrated with, or substantially identical to or part of the computing device that hosts the billing event database. Polling may be carried out by any suitable method, for example automated polling executed by a daemon process and/or manual polling initiated by a user. As used herein, the term "daemon process" refers to a computer program that runs as a background process. Unlike at least some other programs, daemon processes are not under direct control of a user. Instead, daemon processes are controlled by other processes including, for example, an initialization ("init") process. Daemon processes may be of value to allow for active monitoring of a system without direct user interaction. Also, as used herein, daemon processes may be used to facilitate the polling of billing data by polling at periodic intervals as requested by at least one of a user, a system default, and a process control table. If a daemon process is used, the daemon process is scheduled to poll the billing event tables at a frequency set by at least one of a user, a system default, and one of the process control tables.

Before the daemon process polls a billing event table, the computing device may query one of the process control tables to identify a billing event table to poll. In other words, the computing device may submit a query to identify which billing event tables are referenced by a process control table.

In one embodiment, polling the billing event table requires initially determining that the billing event table includes billing event data that is pending (also referred to herein as "pending billing event data"). Billing event tables include billing event records, which may be represented as rows in the billing event tables. If a billing event record is pending, as described above, a status flag may be set to indicate that the billing event record is pending. For example, a column in the billing event table may correspond to the status flag and include a header indicating the status, for example, a column header of "BILLING EVENT PENDING STATUS." In this example, this column may include values of "Y" and "N" for non-null records, wherein a value of "Y" indicates that the billing event record is pending while a value of "N" indicates that it is not pending. If polling (e.g., using a daemon process) identifies billing event records with values of "Y" in a column of "BILLING EVENT PENDING STATUS", those billing event records will be determined to be pending. Therefore, the polling process will determine that billing event data exists that should be extracted and may be used to generate a billing output file wherein the billing output file will be routed to a billing system.

The computing device then extracts the billing event data associated with the pending billing event from the billing event tables. This represents using a method to extract the data including at least one of, without limitation, a database query, an ETL process, and parsing data from records. The billing event data may initially be stored in a standard database format, as an XML file within a database, or any other structured data format. Accordingly, extraction may use any appropriate known techniques for data retrieval, conversion, and modification.

In one embodiment, the computing device subsequently generates a billing output file based on at least a portion of the billing event data. The billing event data may be used to indicate both the content of the billing output file as well as the structure of the billing output file. In other words, particular billing event data may result in a particular format for the billing output file. The computing device is programmed to differentiate between different billing event data, identify an appropriate billing output file layout, and generate a billing output file corresponding to the appropriate billing output file layout. Accordingly, generating the billing output file includes parsing billing event data to determine billing event elements, determining an output format from the billing event elements, and generating a billing output file consistent with the output format.

The computing device next routes the billing output file to a billing system. As noted above, a particular billing center may include a variety of billing systems with varying configurations. Therefore, in one embodiment, routing to the appropriate billing system includes selecting the appropriate billing system from the variety of billing systems. In this embodiment, the computing device is configured to select the appropriate billing system based upon the billing event data, for example because billing systems may be associated with particular billing event data and resultantly particular billing output file formats. Accordingly, the computing device is programmed to differentiate between different billing systems based upon the billing event elements included in billing event data. Therefore, routing the billing output file to a billing system includes parsing billing event data to determine billing event elements, and executing a routing program using billing event elements as arguments.

Once a particular billing output file is generated and routed, the billing event data associated with the billing event record is no longer pending. Accordingly, routing the billing output file to a billing system also includes setting the status flag associated with the billing event record to a non-pending status. For example, for a particular billing event record, the value of the column "BILLING EVENT PENDING STATUS" may be set from "Y" to "N" after routing.

Described herein are example embodiments of systems and methods for consolidating and standardizing billing event data. The systems and methods facilitate, for example, polling billing event tables to determine that billing events are pending, extracting billing event data related to such billing events from billing event tables, generating a billing output file based on the billing event data, and routing the billing output file to a billing system. A technical effect of the systems and methods described herein include at least one of (a) consolidating billing data into a standard format; (b) actively monitoring billing data for pending billing events; (c) converting billing data to billing output files which may be received by a billing system; and (d) routing the billing output file to an appropriate billing system associated with the billing data of the billing output file.

More specifically, the technical effects can be achieved by performing at least one of the following steps: (a) polling a plurality of billing event tables to determine that a billing event is pending; (b) extracting billing event data associated with the pending billing event from the billing event tables; (c) generating a billing output file based upon at least a portion of the billing event data; (d) routing the billing output file to a billing system, the billing system selected from a plurality of billing system options based upon the billing event data, wherein the billing system is associated with the billing event data; (e) determining that a status flag associated with a billing event record indicates a pending status, the billing event record associated with the billing event table; (f) setting a status flag associated with a billing event record to a non-pending status; (g) identifying polled billing event tables based upon querying a process control table; (h) using a polling daemon process scheduled to poll the polled billing event tables at a frequency set by at least one of the of a user, a system default, and the process control table; (i) parsing billing event data to determine billing event elements, determining an output format from the billing event elements, and generating a billing output file consistent with the output format; and (j) parsing billing event data to determine billing event elements, and executing a routing program using billing event elements as arguments.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to managing computing infrastructures.

As used herein, an element or step recited in the singular and proceeded with the word "a", "the", or "an" should be understood as not excluding plural elements or steps, unless such exclusion is explicitly recited. Rather, an element or step recited in the singular and proceeded with the word "a", "the", or "an" should be interpreted to mean "at least one or more." Furthermore, references to "example embodiment" or "one embodiment" of the present disclosure are not intended to be interpreted as excluding the existence of additional embodiments that also incorporate the recited features.

FIG. 1 is a simplified block diagram of an example billing consolidation and standardization system 100, including a plurality of computer devices in accordance with one embodiment of the present disclosure. In this embodiment, system 100 includes a controller server 112 and a plurality of client sub-systems 114 (also referred to as "hosts" 114) connected to the controller server 112. In one embodiment, the hosts 114 are computing devices in communication with controller server 112 via a network 115, such an such as a local area network (LAN) or a wide area network (WAN), dial-in-connections, cable modems, and special high-speed Integrated Services Digital Network (ISDN) lines, the Internet or the like. In the example embodiment, hosts 114 may be associated with one or more particular business processes. Hosts 114 may therefore generate distinct billing event data that is transferred to database server 116 via network 115 and stored in billing event tables on database 120.

In the example embodiment, controller server 112 includes a database server 116 in communication with database 120, which contains billing event data generated by one or more of hosts 114, as described below in greater detail. In one embodiment, centralized database 120 is stored on controller server 112 and can be accessed by potential users at one or more of hosts 114 by logging onto controller server 112 through one of hosts 114. In an alternative embodiment, database 120 is stored remotely from controller server 112.

Database 120 may include a single database having separated sections or partitions or may include multiple databases, each being separate from each other. Database 120 may also store information associated with billing event data, such as process control data stored on process control tables, generic billing event tables, and detailed billing event tables. Database 120 may also store information associated with generating billing output files from billing event data, including file format layouts. Database 120 may additionally store information associated with the routing billing output files from billing event data, including billing system identifiers, billing system requirements, and billing system transfer protocols. As discussed below, billing event data generated by hosts 114 is updated periodically, and is stored within database 120.

Figure 2:
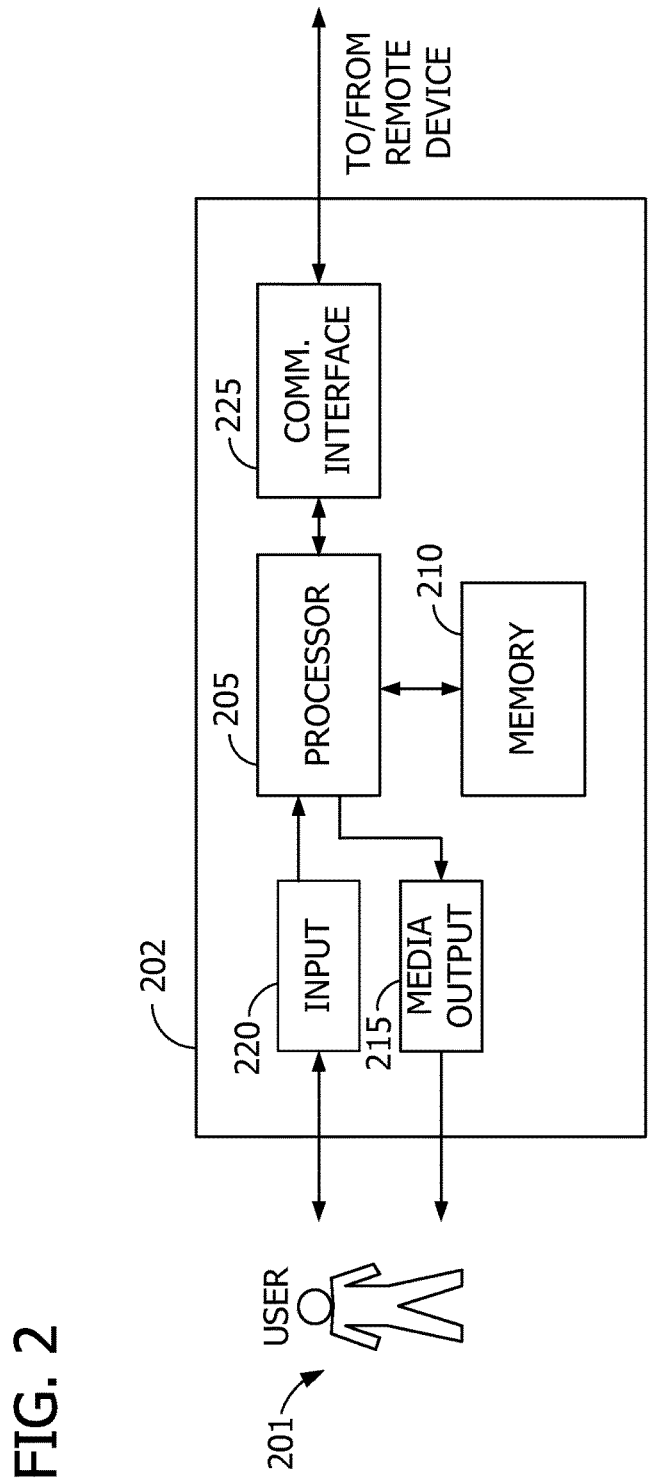
FIG. 2 illustrates an example configuration of a client system shown in FIG. 1.

FIG. 2 illustrates an example configuration of a user system 202 operated by a user 201, such as a system administrator. User system 202 may include, but is not limited to, hosts 114 (shown in FIG. 1). In the example embodiment, user system 202 includes a processor 205 for executing instructions. In some embodiments, executable instructions are stored in a memory area 210. Processor 205 may include one or more processing units, for example, as a multi-core configuration. Memory area 210 is any device allowing information such as executable instructions and/or written works to be stored and retrieved. Memory area 210 may include one or more computer readable media. Memory 210 may store data in a non-transitory or transitory manner.

User system 202 also includes at least one media output component 215 for presenting information to user 201. Media output component 215 may be any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker, headphones or the like.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as controller server 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from controller server 112. A client application allows user 201 to interact with a server application from controller server 112.

Figure 3:
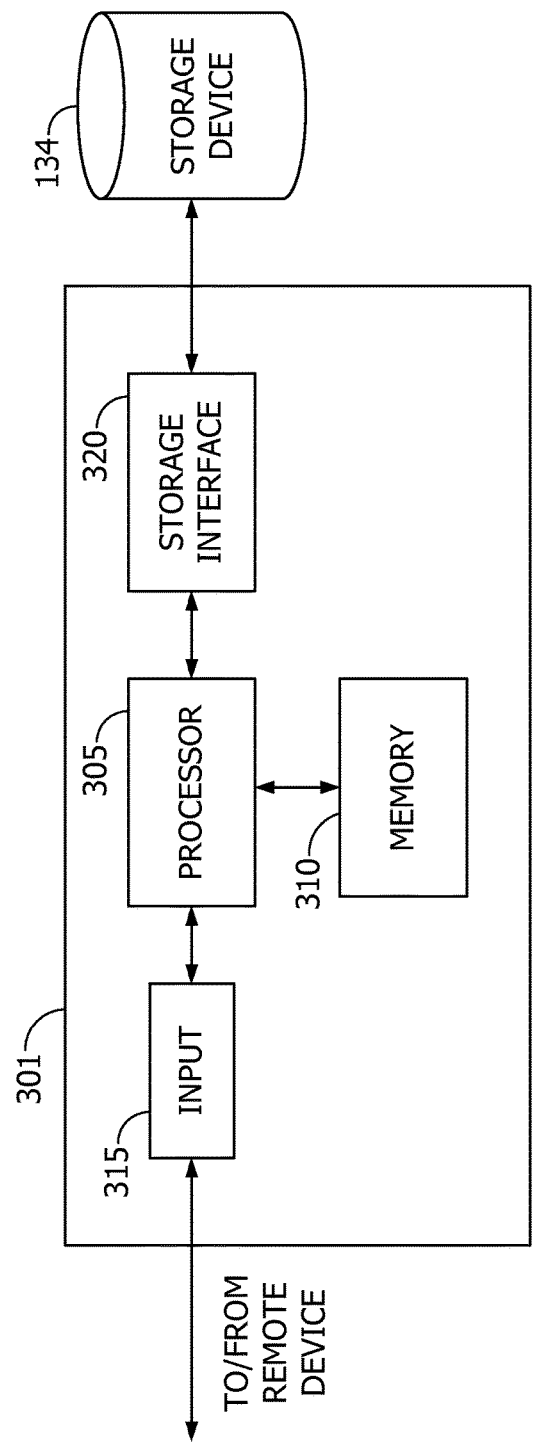
FIG. 3 illustrates an example configuration of a server system shown in FIG. 1.

FIG. 3 illustrates an example configuration of a server system 301 such as controller server 112 (shown in FIGS. 1 and 2). In the exemplary embodiment, server system 301 includes a processor 305 for executing instructions. Instructions may be stored in a memory area 310, for example. Memory area 310 may store data in a non-transitory or transitory manner Processor 305 may include one or more processing units (e.g., in a multi-core configuration) for executing instructions. The instructions may be executed within a variety of different operating systems on the server system 301, such as UNIX®, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from hosts 114 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
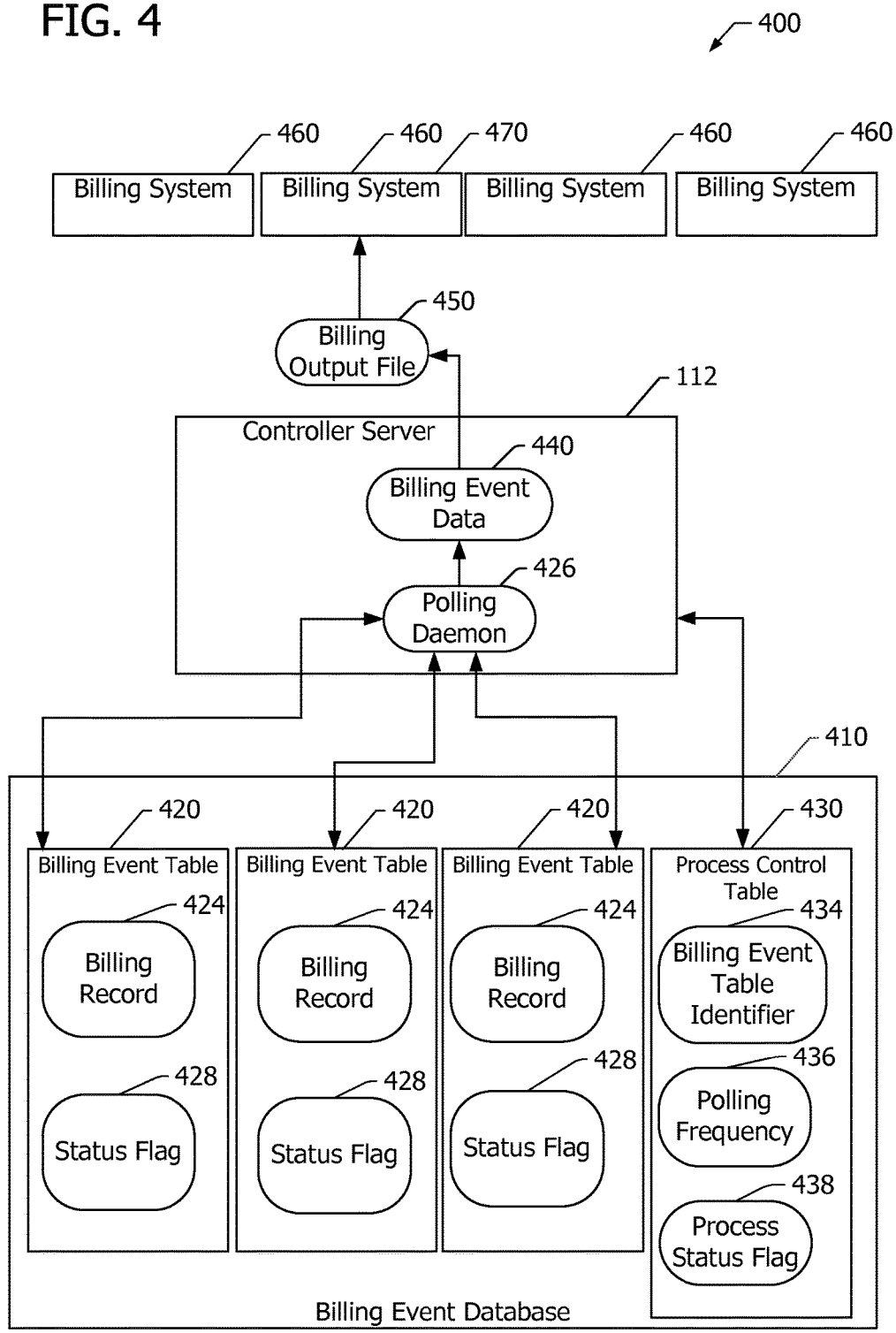
FIG. 4 is a schematic diagram illustrating the data model used by the system shown in FIG. 1 for consolidating and standardizing billing event data.

FIG. 4 is a schematic diagram 400 illustrating the data model used by controller server 112 (shown in FIG. 1) for consolidating and standardizing billing event data. Diagram 400 includes controller server 112. As illustrated in FIG. 3, controller server 112 includes a processor 305, memory 310, storage interface 320, and storage device 134 (shown in FIG. 3). Polling daemon 426 runs as a background process on processor 305 of controller server 112. Polling daemon 426 is capable of communicating with (i.e., polling) billing event database 410 and, more specifically, billing event tables 420 stored thereon. Controller server 112 is also in communication with process control table 430.

In the example embodiment, billing event database 410 is physically and architecturally distinct from controller server 112. In alternative embodiments, billing event database 410 may reside in the same physical machine as controller server 112. For example, billing event database 410 may be stored at database 120 residing on database server 116 (shown in FIG. 1). Billing event database 410 includes billing event tables 420 and process control tables 430. In the example embodiment, billing event database 410 represents one database server. In alternative embodiments, billing event tables 420 and process control tables 430 may be distributed over a plurality of database servers that are in communication with controller server 112.

Billing event table 420 includes billing records 424. Billing records 424 includes billing data associated with particular billing events including, without limitation, billing codes, total charges to bill, customer identifiers, vendor identifiers, quantities of products or services, and costs of products or services. Such billing data may be referred to as detailed billing data. Billing records 424 also includes billing metadata associated with particular billing events including, without limitation, file name, file path, unique identifiers, timestamp, record length, and references to related records. Such billing metadata may be referred to as generic billing data. Generic billing data allows for high-level descriptions of billing data. Billing records 424 of different types may be stored in the same or different billing event tables 420. For example, generic billing data may occupy a different billing event table than detailed billing data. Alternately, billing records 424 originating from different hosts 114 may be stored on different billing event tables.

Process control tables 430 include data related to the polling (i.e., monitoring) of billing records 424 stored on billing event tables 420. Process control tables 430 may include extensive information related to such polling including, at least, billing event table identifier 434 and polling frequency data 436. Billing event table identifier 434 includes information which may be used to identify which billing event tables 420 should be polled. In the exemplary embodiment, billing event table identifier 434 refers to a particular category of billing information wherein the possible categories of billing information are static. Accordingly, controller server 112 is able to resolve to a particular billing event table 420 based upon the reference to a particular category of billing information in billing event table identifier 434. In other embodiments, a billing event table identifier 434 may include other information which may be used to identify billing event table 420 including explicit reference to billing event table 420. Polling frequency data 436 defines the frequency at which billing event tables 420 should be polled. Polling frequency data 436 may be defined in process control table 430 by at least one of a user such as user 201 (shown in FIG. 2), or a system default. Process control tables 430 also include process status flag 438 indicating whether particular billing event table 420 referenced by billing event table identifier 434 is pending. If a particular billing event table 420 referenced by billing event table identifier 434 are in a pending state, process status flag 438 may have a value of "Y." If a particular billing event table 420 referenced by billing event table identifier 434 are not in a pending state, process status flag 438 may have a value of "N."

Diagram 400 also includes billing output file 450. Billing output file 450 is generated by controller server 112 based upon billing event data 440 parsed after extracting billing records 424 from billing event tables 420. Billing output file 450 is routed by controller server 112 to a particular routed billing system 470 selected from billing system options 460.

In operation, controller server 112 initially polls billing event tables 420 or process control table 430 to determine that a billing event is pending. Controller server 112 may identify which billing event tables 420 to poll based upon initially querying process control table 430 to determine billing event table identifier 434. In the exemplary embodiment, billing event table identifier 434 includes information which identifies a particular category of billing information. Controller server 112 stores information at memory 210 (shown in FIG. 2) which correlates particular categories of billing information to particular billing event tables 420. In other embodiments, controller server 112 may use alternative methods to identify a particular billing event table 420 based upon billing event table identifier 434. For example, billing event table identifier 434 may include rows or other forms of records with identifiers indicating which billing event tables 420 should be polled. Controller server 112 will also determine whether a process status flag 438 associated with billing event table identifier 434 is pending. For example, controller server 112 may poll process control table 430 and identify all billing event table identifiers 434 with a process status flag 438 with a value of "Y." Controller server 112 may also identify an appropriate frequency to poll billing event tables 420 based upon querying polling frequency data 436 from process control table 430. Polling frequency data 436 may vary based upon a particular polled billing event table 420. In other words, polling frequency data 436 may indicate that a first polled billing event table 420 should be polled at a first rate while a second polled billing event table 420 should be polled at a second rate. Controller server 112 may also identify an appropriate frequency or frequencies (e.g., where frequencies vary for particular billing event tables 420) to poll billing event tables 420 based upon input from a user such as user 201 (shown in FIG. 2) or system defaults. In the example embodiment, controller server 112 uses a daemon process to poll billing event tables 420 or process control table 430. The daemon process may be controlled by another program (e.g., an init program) without requiring any interaction by user 201. The daemon process can therefore easily continually monitor billing event tables 420 or process control table 430 without relying on any manual intervention.

Polling billing event tables 420 substantially represents querying status flag 428 for a particular billing event table 420 to determine if any billing records 424 are pending. In the example embodiment, this may be accomplished by querying the value for the column associated with status flag 428 (e.g., querying for billing records 424 wherein the value for a column labeled BILLING EVENT STATUS is "Y"). If no billing records 424 are pending for a particular billing event table 420, then controller server 112 will wait until the next polling event. In some cases, billing records 424 may not be pending for a particular billing event table 420 but are pending for a different billing event table 420.

Controller server 112 next extracts billing event data 440 associated with the pending billing event from the billing event tables 420. In other words, controller server 112 queries, copies, or otherwise removes billing records 424 associated with a status flag 428 that is pending. Extracting billing event data 440 may be executed using a database query, an ETL function, or any other manner of data extraction appropriate to the systems and methods described herein. Extracting billing event data 440 further includes writing billing records 424 to memory (e.g., memory 310) for further processing. Writing billing records 424 to memory 310 additionally allows for redundancy if the process is interrupted for any reason.

Controller server 112 uses billing event data 440 to generate billing output file 450. Billing output file 450 is generated based upon at least a portion of billing event data 440. As described above, billing event data 440 may include information related to the appropriate file layout for billing output file 450. Controller server 112 parses billing event data 440 to determine billing event elements, determines an output format, and generates a billing output file 450 consistent with that output format. Particular formats or layouts may vary for billing output files 450 based upon particular attributes of billing event data 440 including, without limitation, particular billing codes, particular billing charges, and particular customers. For example controller server 112 may parse billing event data 440 and determine billing event elements demonstrate that billing event data 440 is associated with billing code "12345X". Controller server 112 may be programmed to determine that billing event data 440 associated with billing code "12345X" should use a corresponding file layout and format distinct from that used for billing event data associated with, for example, billing code "98765Y".

Controller server 112 next routes billing output file 450 to a billing system 470 selected from a plurality of billing system options 460. Controller server 112 is programmed to determine, using billing event data 440 and billing event elements parsed from billing event data 440, billing system 470. Controller server 112 makes such a determination based upon the fact that at least some billing event data 440 is associated with particular billing systems 470. Such an association may be based upon the fact that particular billing systems 470 are used for billing requests associated with attributes including, without limitation, particular billing codes, particular billing charges, and particular customers. For example controller server 112 may parse billing event data 440 and determine billing event elements demonstrate that billing event data 440 is associated with "Customer A." Controller server 112 may be programmed to determine that billing event data 440 associated with "Customer A" routes to billing system 470. Accordingly, controller server 112 will route billing output file to billing system 470. In other words, after parsing billing event data 440 to determine billing event elements, controller server 112 will execute a routing program using these billing event elements as arguments. The routing program may transfer billing output file 450 to an appropriate billing system 470 using any appropriate method of file and/or data transfer including, without limitation, FTP, SFTP, email, database updates, API based transfers, and proprietary transfer methods.

Once controller server 112 has routed billing output file 450 to billing system 470, controller server 112 may be used to update billing event tables 420. Billing records 424 used to generate billing output files 450 are no longer pending and may need to be updated in order to avoid unnecessary querying and billing requests. Accordingly, controller server 112 may change status flag 428 associated with billing records 424 used to generate routed billing output files 450 from pending to not pending. For example, status flag 428 for such billing records 424 may be changed from "Y" to "N". Additionally, controller server 112 may change process status flag 438 from "Y" to "N" once all relevant billing event tables 420 have been polled. Relevant billing event tables 420 are those tables associated with a particular billing event table identifier 434 queried by controller server 112.

Figure 5:
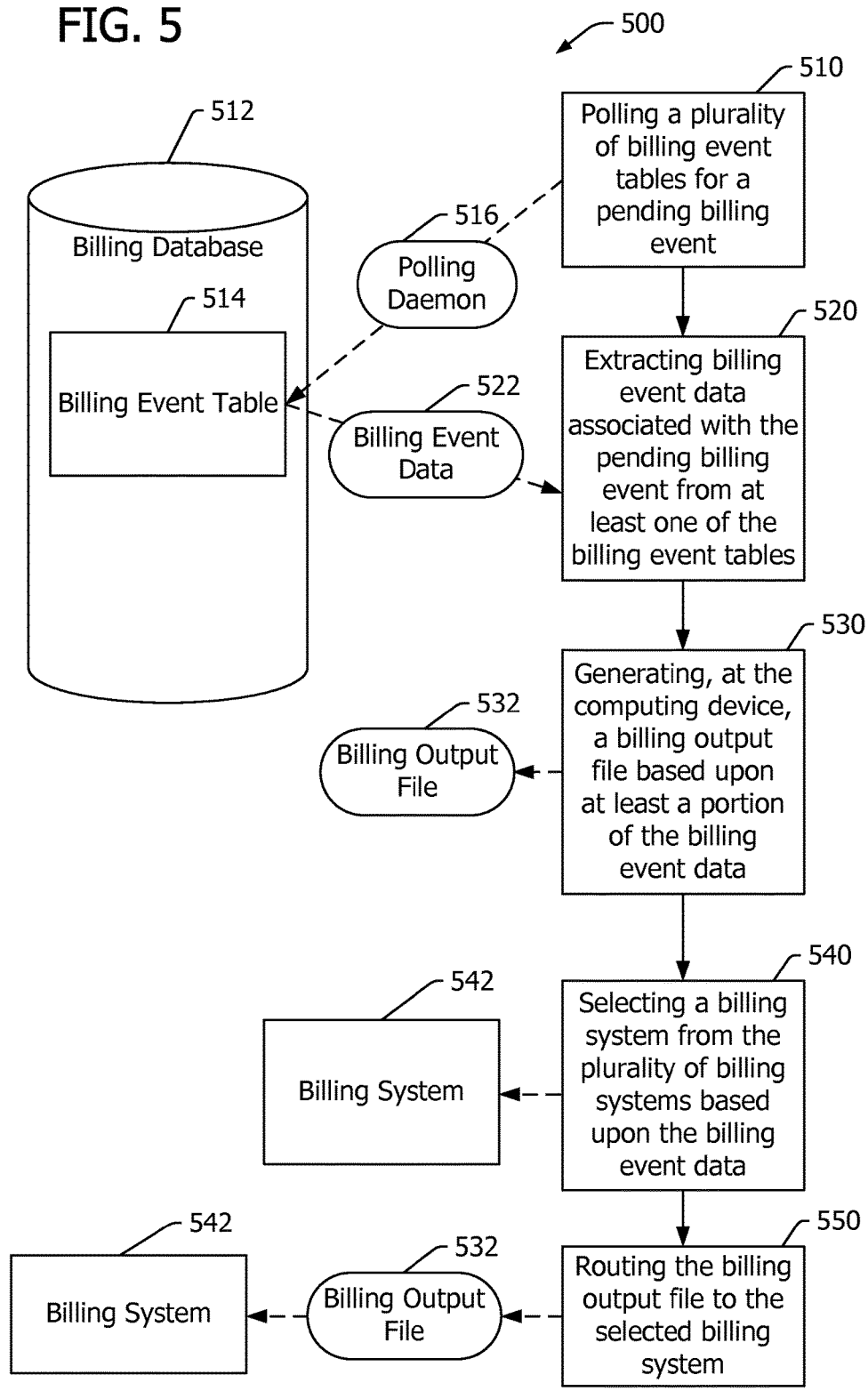
FIG. 5 is a flowchart illustrating an example process utilized by the system shown in FIG. 1 for consolidating and standardizing billing event data.

FIG. 5 is a flowchart illustrating an example process 500 utilized by controller server 112 (shown in FIG. 1) for consolidating and standardizing billing event data. Initially, controller server 112 polls 510 a billing event table to determine that a billing event is pending. In the example embodiment, controller server 112 polls billing event table 514 stored in billing database 512. Polling 510 represents querying billing event table 514 to determine whether a billing event record in billing event table 514 is in a pending status. Billing event record may be, for example, billing event record 424 (shown in FIG. 4). A pending status may be indicated by identifying a status flag in billing event records in billing event table 514 and determining whether the flag is set to a pending status. Controller server 112 determines which billing event table 514 to poll 510 by referring to a process control table such as process control table 430 (shown in FIG. 4). The process control table also may allow controller server 112 to determine the frequency of polling 510. The frequency of polling 510 may alternately be determined by a user of controller server 112 or system defaults. Controller server 112 uses polling daemon 516 (running as a background process in controller server 112) to poll 510 billing event table 514.

On finding pending billing events, controller server 112 extracts 520 billing event data associated with the pending billing events from the billing event table. Controller server 112 uses any method of data extraction including, without limitation, querying, ETL methods, or copying to extract billing event data 522 from billing event tables 514.

Using billing event data 522, controller server 112 generates 530, a billing output file 532 based upon at least a portion of billing event data 522. Billing event data 522 may include self-describing metadata which allows controller server to determine how to create billing output file 532 (i.e., appropriate file formats and layouts). Controller server 112 may accordingly parse billing event data 522, determine an appropriate file format and/or layout, and generate billing output file 532 accordingly.

Upon generating 530 billing output file 532, controller server 112 selects 540 a billing system 542 from a plurality of billing systems options 460 (shown in FIG. 4) based upon billing event data 522. Particular billing systems 542 are associated with particular billing event data 522, as described above. Controller server 112 accordingly parses billing event data 522 and/or billing output file 532, extracts information related to identifying an appropriate billing system 542, and selects 540 a billing system 542.

Upon such determination, controller server 112 routes 550 billing output file 532 to billing system 542. In other words, controller server 112 transfers billing output file 532 to an appropriate billing system 542 using any appropriate method of file and/or data transfer including, without limitation, FTP, SFTP, email, database updates, API based transfers, and proprietary transfer methods. After routing 550 billing output file 532 to billing system 542, controller server 112 may update billing event records at billing event table 514 by changing status flags from pending to non-pending states.

Figure 6:
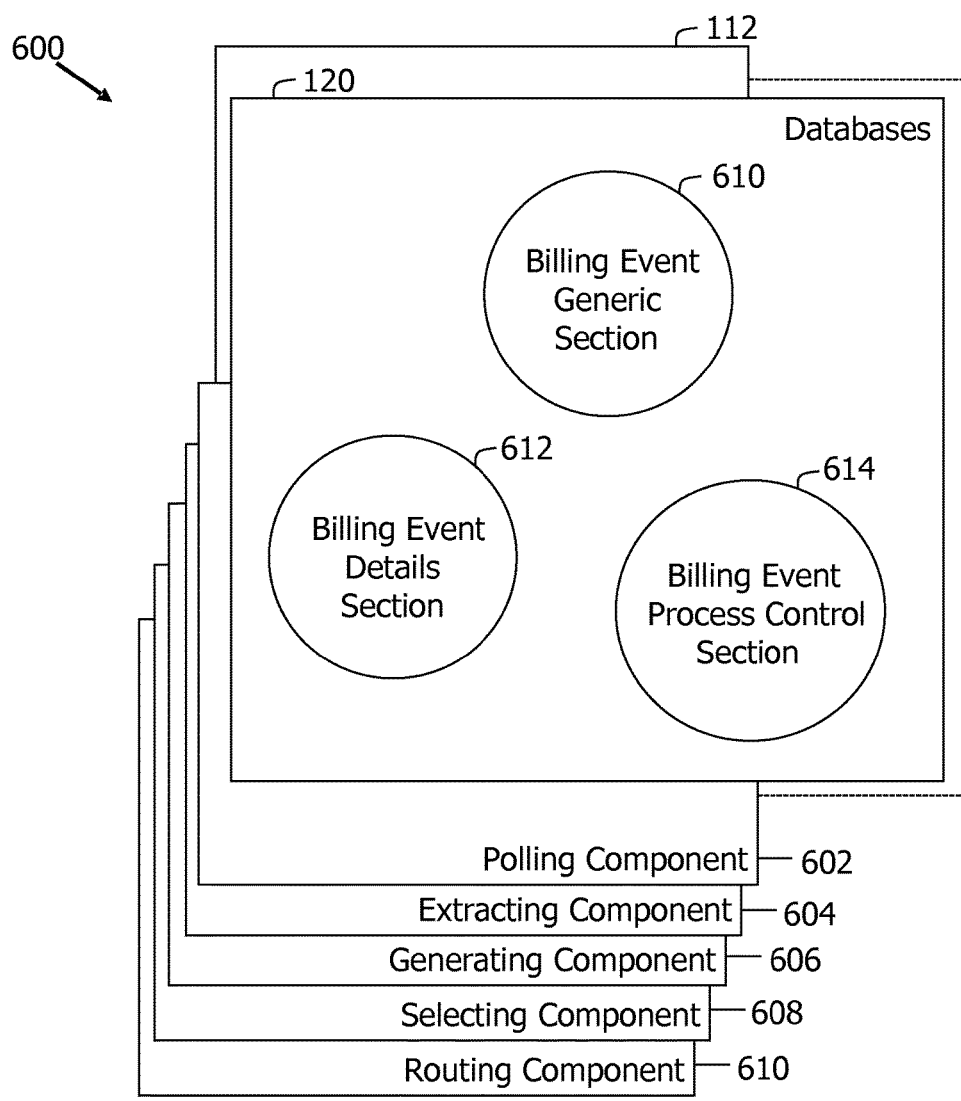
FIG. 6 is a diagram of components of one or more example computing devices that may be used in the environment shown in FIG. 4.

FIG. 6 is a diagram 600 of components of one or more example computing devices, for example controller server 112 that may be used in the environment shown in FIG. 4. FIG. 6 further shows a configuration of databases including at least database 120 (shown in FIG. 1). Database 120 is coupled to several separate components within controller server 112, which perform specific tasks.

Controller server 112 includes a polling component 602 for polling a plurality of billing event tables to determine that a billing event is pending. Controller sever 112 also includes a extracting component 604 for extracting billing event data associated with the pending billing event from the billing event tables. Controller server 112 additionally includes a generating component 606 for generating a billing output file based upon at least a portion of the billing event data. Controller server 112 additionally includes a selecting component 608 for selecting a billing system from a plurality of billing systems based upon the billing event data, wherein the billing system is associated with the billing event data. Controller server 112 additionally includes a routing component 610 for routing the billing output file to the selected billing system.

In an exemplary embodiment, database 120 is divided into a plurality of sections, including but not limited to, a billing event generic section 610, a billing event details section 612, and a billing event process control section 614. These sections within database 120 are interconnected to update and retrieve the information as required.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for converting standardized billing event data into a formatted billing output file thereby allowing storage of billing event data in a single standardized format and conversion of the standardized billing event data into one or more billing formats, the method implemented by a billing standardization computing device coupled to a memory device, the method comprising:
   querying a process control table to identify a billing event table identifier, polling frequency data, and extraction method data stored in the process control table;
   determining, based on the billing event table identifier stored in the process control table, a plurality of billing event tables to poll;
   determining, based on the polling frequency data stored in the process control table, a polling frequency for the plurality of billing event tables;
   determining, based on the extraction method data stored in the process control table, an extraction method for use with the plurality of billing event tables, wherein the extraction method includes at least one of a database query, an ETL process, and parsing XML data;
   polling the plurality of billing event tables at the polling frequency to identify a pending billing event record, wherein the pending billing event record is defined as a billing event record including a status flag set to a pending status;
   extracting, using the extraction method determined from the extraction method data stored in the process control table, (i) billing event data including a billing code, a billing charge amount, and a customer identifier, and (ii) metadata associated with the billing event data, wherein the billing event data is associated with the pending billing event record from at least one of the billing event tables, and wherein the billing event data includes a plurality of billing event elements;
   determining an output format by (i) parsing the extracted billing event data to identify the associated billing code, billing charge amount, and customer identifier and perform a lookup within the memory device using the parsed billing event data to retrieve an output format associated with the extracted billing event data, and (ii) parsing the extracted metadata associated with the billing event data to determine how to create a billing output file, wherein the output format is associated with a billing system;
   generating, at the computing device, the billing output file based upon at least a portion of the billing event data and the output format determined by parsing the extracted billing event data and the extracted metadata;
   selecting the billing system from a plurality of billing systems based upon the billing event data;
   routing the billing output file to the selected billing system, wherein the output format of the billing output file is recognizable by the selected billing system; and
   updating the pending billing event record to change the status flag to a non-pending status.

2. The method of claim 1, wherein polling the billing event tables further comprises:
   identifying a status flag definition defining the pending status and the non-pending status; and
   determining whether the status flag associated with the pending billing event record indicates the pending status as defined by the status flag definition, the pending billing event record associated with the billing event table.

3. The method of claim 1, wherein the polling frequency stored in the process control table is set by at least one of a user and a system default.

4. The method of claim 1, wherein routing the billing output file to a billing system further comprises:
   parsing the billing event data to determine the billing event elements; and
   executing a routing program using the billing event elements.

5. The method of claim 1, further comprising:
   determining the output format associated with the billing event data, based on the customer identifier.

6. The method of claim 1, further comprising:
   determining the output format associated with the billing event data, based on the billing charge amount.

7. The method of claim 1, further comprising:
   updating the process control table by setting a process status flag to a non-pending status upon determining that all identified billing event tables have been polled.

8. The method of claim 1, wherein the billing event table identifier in the process control table specifies a category of billing information, and wherein determining the plurality of billing event tables to poll comprises determining the plurality of billing event tables to poll based on the category of billing information specified in the billing event table identifier.

9. The method of claim 1, wherein querying a process control table comprises querying a process control table stored in a billing event database, and wherein the plurality of billing event tables are stored in the same billing event database as the process control table.

10. A billing standardization computer system for converting standardized billing event data into a formatted billing output file thereby allowing storage of billing event data in a single standardized format and conversion of the standardized billing event data into one or more billing formats, the billing standardization computer system comprising:
   a processor;
   a memory device in communication with said processor, said processor configured to:
   query a process control table to identify a billing event table identifier, polling frequency data, and extraction method data stored in the process control table;
   determine, based on the billing event table identifier stored in the process control table, a plurality of billing event tables to poll;
   determine, based on the polling frequency data stored in the process control table, a polling frequency for the plurality of billing event tables;
   determine, based on the extraction method data stored in the process control table, an extraction method for use with the plurality of billing event tables, wherein the extraction method includes at least one of a database query, an ETL process, and parsing XML data;

poll the plurality of billing event tables at the polling frequency to identify a pending billing event record, wherein the pending billing event record is defined as a billing event record including a status flag set to a pending status;

extract, using the extraction method determined from the extraction method data stored in the process control table, (i) billing event data including a billing code, a billing charge amount, and a customer identifier, and (ii) metadata associated with the billing event data, wherein the billing event data is associated with the pending billing event record from at least one of the billing event tables, and wherein the billing event data includes a plurality of billing event elements;

determine an output format by (i) parsing the extracted billing event data to identify the associated billing code, billing charge amount, and customer identifier and perform a lookup within the memory device using the parsed billing event data to retrieve an output format associated with the extracted billing event data, and (ii) parsing the extracted metadata associated with the billing event data to determine how to create a billing output file, wherein the output format is associated with a billing system;

generate the billing output file based upon at least a portion of the billing event data and the output format determined by parsing the extracted billing event data and the extracted metadata;

select a billing system from a plurality of billing systems based upon the billing event data;

route the billing output file to the selected billing system, wherein the output format of the billing output file is recognizable by the selected billing system; and update the pending billing event record to change the status flag to a non-pending status.

11. A billing standardization computer system in accordance with claim 10 wherein the processor is further configured to:

identify a status flag definition defining the pending status and the non-pending status; and determine whether the status flag associated with the pending billing event record indicates the pending status as defined by the status flag definition, the pending billing event record associated with the billing event table.

12. A billing standardization computer system in accordance with claim 10 wherein the polling frequency stored in the process control table is set by at least one of a user and a system default.

13. A billing standardization computer system in accordance with claim 10, wherein the processor is further configured to:

parse the billing event data to determine the billing event elements; and execute a routing program using the billing event elements.

14. Computer-readable non-transitory storage media for converting standardized billing event data into a formatted billing output file thereby allowing storage of billing event data in a single standardized format and conversion of the standardized billing event data into one or more billing formats, the computer-readable non-transitory storage media having computer-executable instructions embodied thereon, wherein, when executed by at least one processor, the computer-executable instructions cause the processor to:

query a process control table to identify a billing event table identifier, polling frequency data, and extraction method data stored in the process control table;

determine, based on the billing event table identifier stored in the process control table, a plurality of billing event tables to poll;

determine, based on the polling frequency data stored in the process control table, a polling frequency for the plurality of billing event tables;

determine, based on the extraction method data stored in the process control table, an extraction method for use with the plurality of billing event tables, wherein the extraction method includes at least one of a database query, an ETL process, and parsing XML data;

poll the plurality of billing event tables at the polling frequency to identify a pending billing event record, wherein the pending billing event record is defined as a billing event record including a status flag set to a pending status;

extract, using the extraction method determined from the extraction method data stored in the process control table, (i) billing event data including a billing code, a billing charge amount, and a customer identifier, and (ii) metadata associated with the billing event data, wherein the billing event data is associated with the pending billing event record from at least one of the billing event tables, and wherein the billing event data includes a plurality of billing event elements;

determine an output format by (i) parsing the extracted billing event data to identify the associated billing code, billing charge amount, and customer identifier and perform a lookup within the memory device using the parsed billing event data to retrieve an output format associated with the extracted billing event data, and (ii) parsing the extracted metadata associated with the billing event data to determine how to create a billing output file, wherein the output format is associated with a billing system;

generate the billing output file based upon at least a portion of the billing event data and the output format determined by parsing the extracted billing event data and the extracted metadata;

select a billing system from a plurality of billing systems based upon the billing event data;

route the billing output file to the selected billing system, wherein the output format of the billing output file is recognizable by the selected billing system; and updating the pending billing event record to change the status flag to a non-pending status.

15. The computer-readable non-transitory storage media in accordance with claim 14 wherein the computer-executable instructions further cause the processor to:

identify a status flag definition defining the pending status and the non-pending status; and determine whether the status flag associated with the pending billing event record indicates the pending status as defined by the status flag definition, the pending billing event record associated with the billing event table.

16. The computer-readable non-transitory storage media in accordance with claim 14, wherein the polling frequency is set by at least one of a user and a system default.

17. The computer-readable non-transitory storage media in accordance with claim 14 wherein the computer-executable instructions further cause the processor to:

parse the billing event data to determine the billing event elements; and execute a routing program using the billing event elements.

\* \* \* \* \*